US006631418B1

(12) United States Patent
Watkins

(10) Patent No.: US 6,631,418 B1
(45) Date of Patent: *Oct. 7, 2003

(54) SERVER FOR OPERATION WITH A LOW-COST MULTIMEDIA TERMINAL

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,647

(22) Filed: Apr. 5, 2000

(51) Int. Cl.[7] ............................................. G06F 15/16
(52) U.S. Cl. ...................................................... 709/231
(58) Field of Search ................................ 709/200–203, 709/231; 725/91, 92, 86

(56) References Cited

U.S. PATENT DOCUMENTS 6,009,470 A    12/1999   Watkins ....................... 709/231

*Primary Examiner*—Glenton B. Burgess
*Assistant Examiner*—Kimberly Flynn
(74) *Attorney, Agent, or Firm*—Thelen Reid & Priest LLP

(57) ABSTRACT

A server for providing personal computer (PC) functionality to a user at a multimedia terminal processes commands from the user. The server includes a source upgrade processor, a client software component for receiving a command signal from the user, a display updater for combining signals and a video encoder for sending a digital audio/visual (A/V) data-stream to a multimedia terminal. The server enables concurrent computer application processing for multiple simultaneous thin client users each having a multimedia terminal using a communication link to connect them to the server.

21 Claims, 5 Drawing Sheets

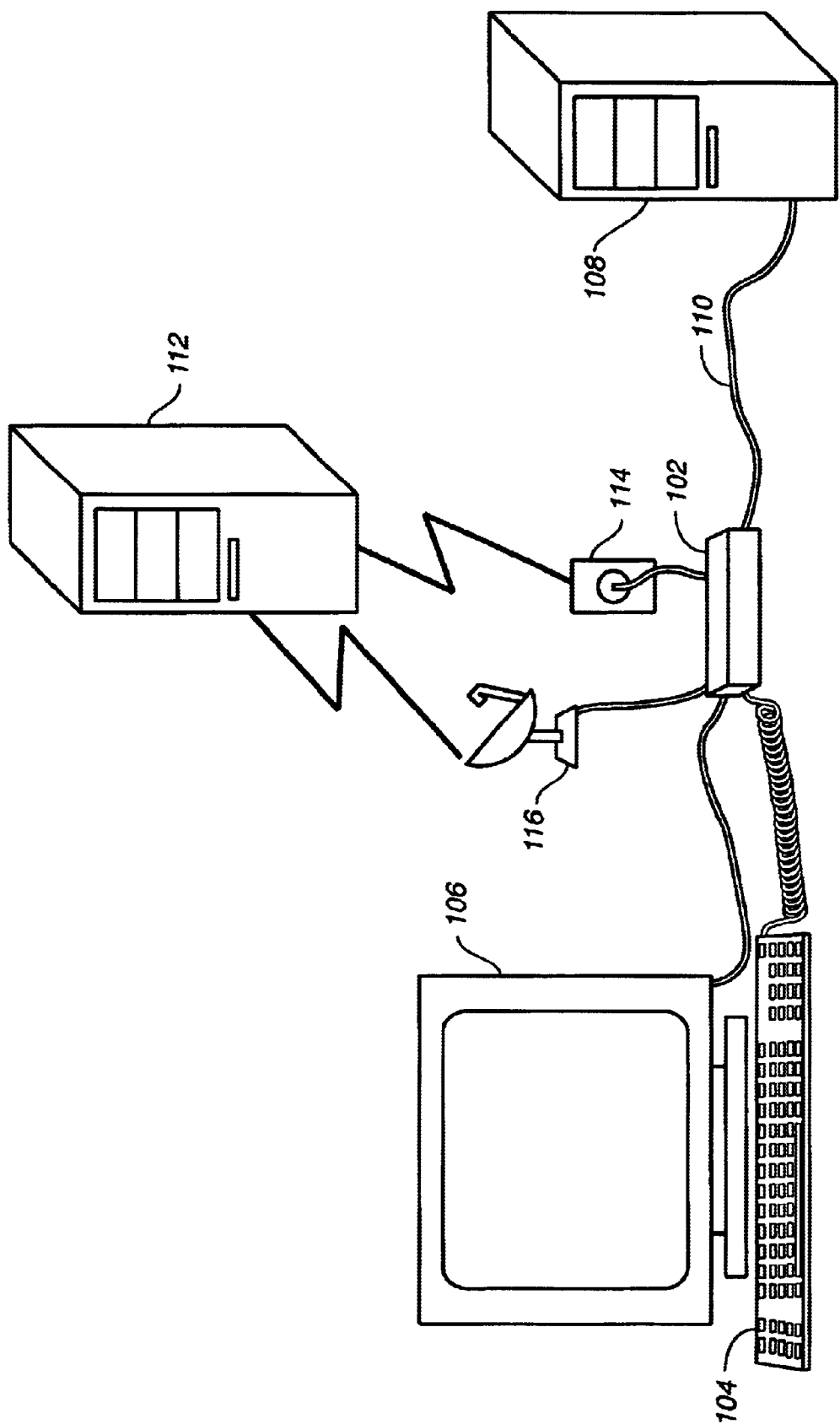

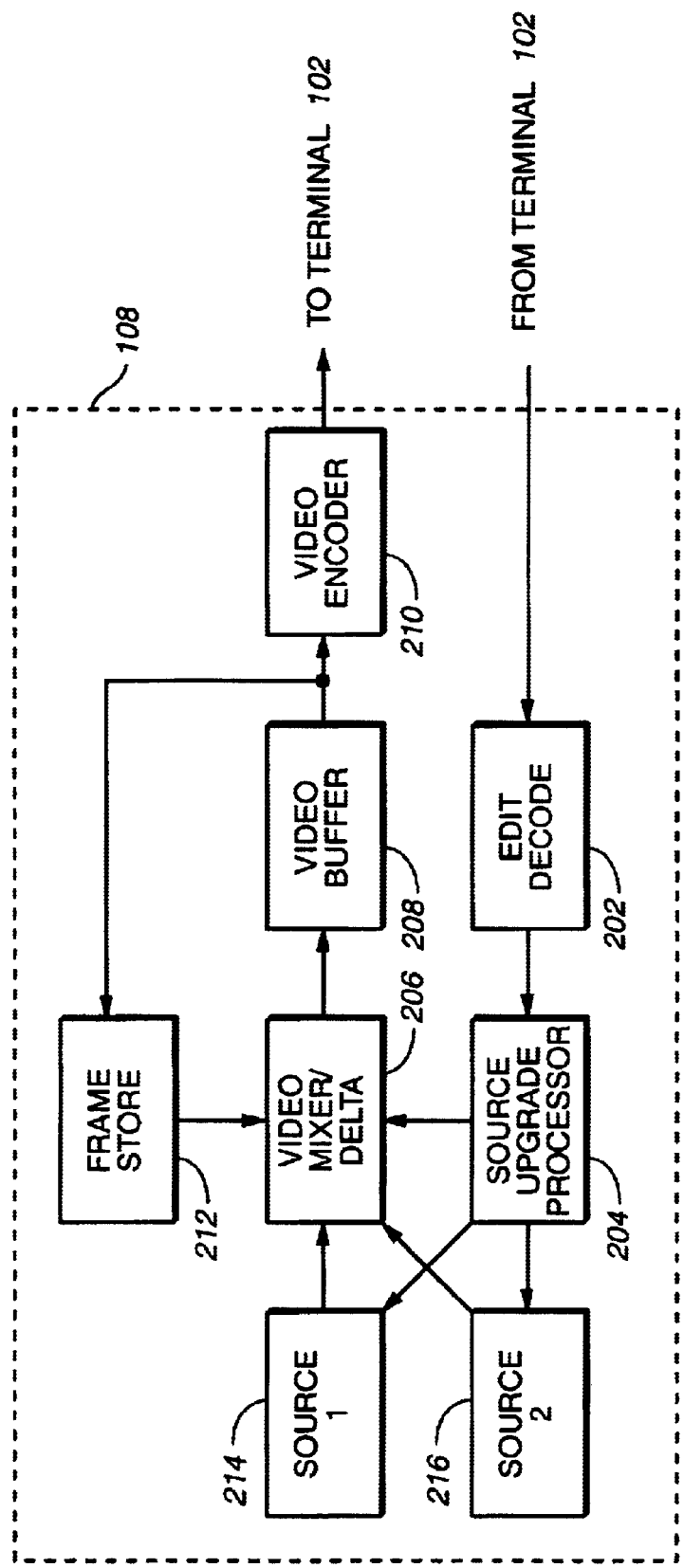
FIG._2

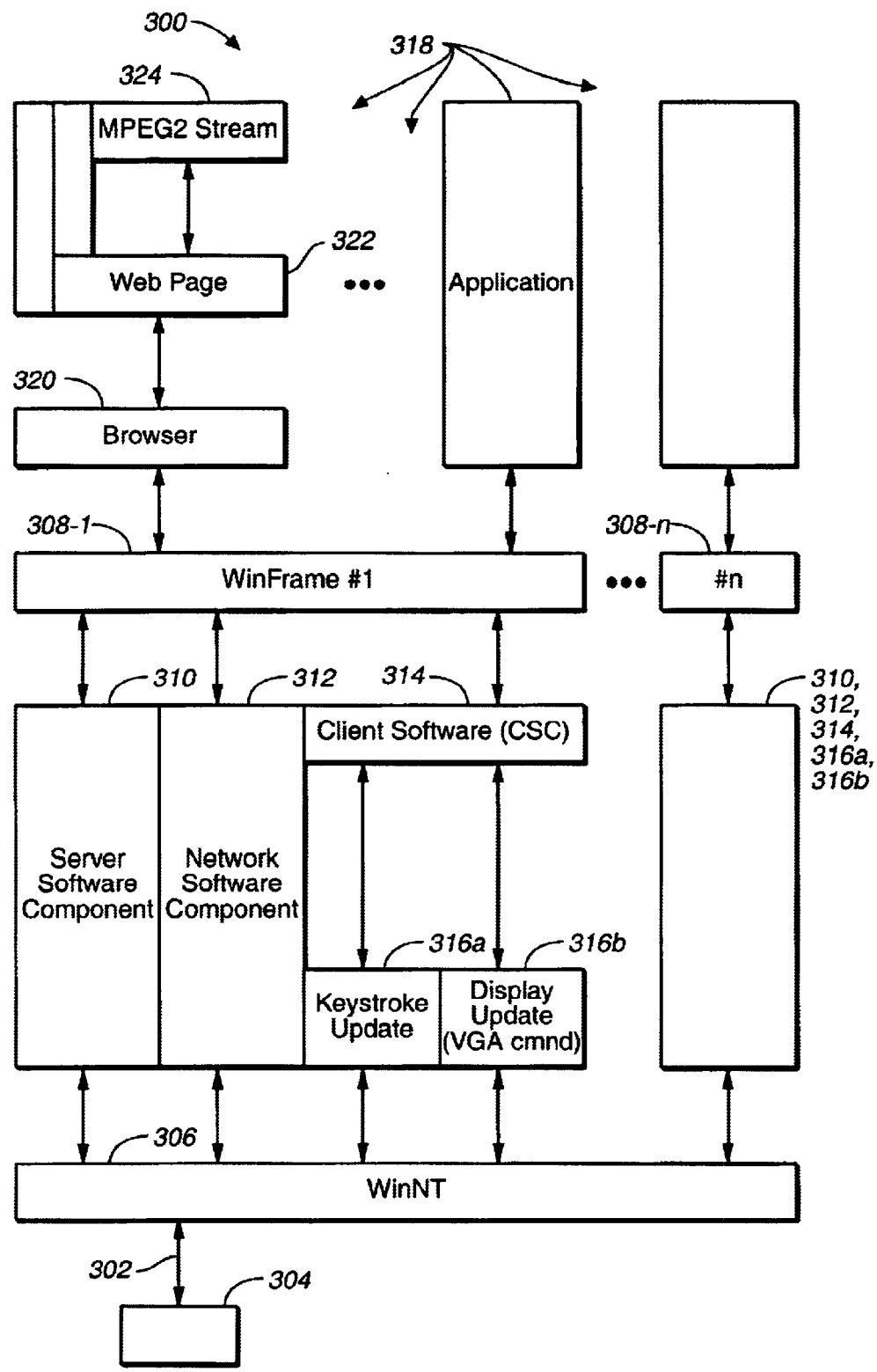
FIG._3

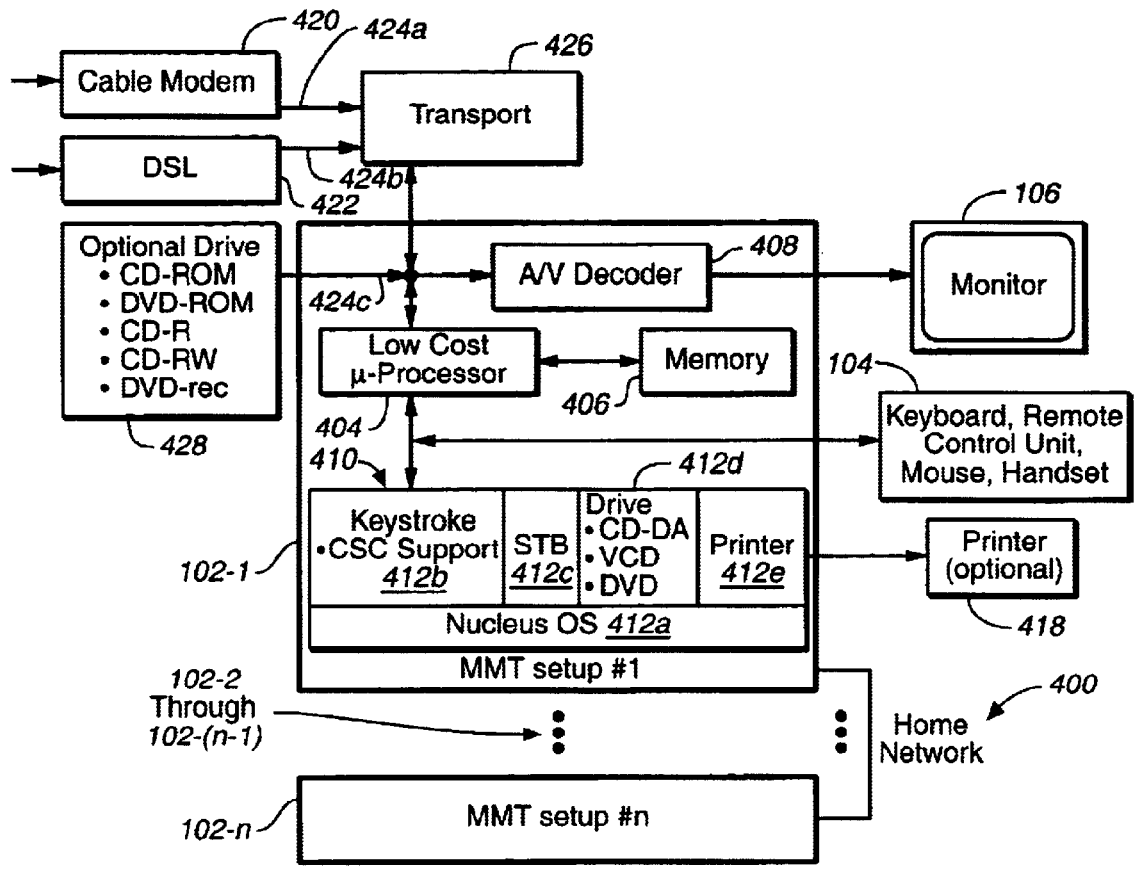
FIG._4

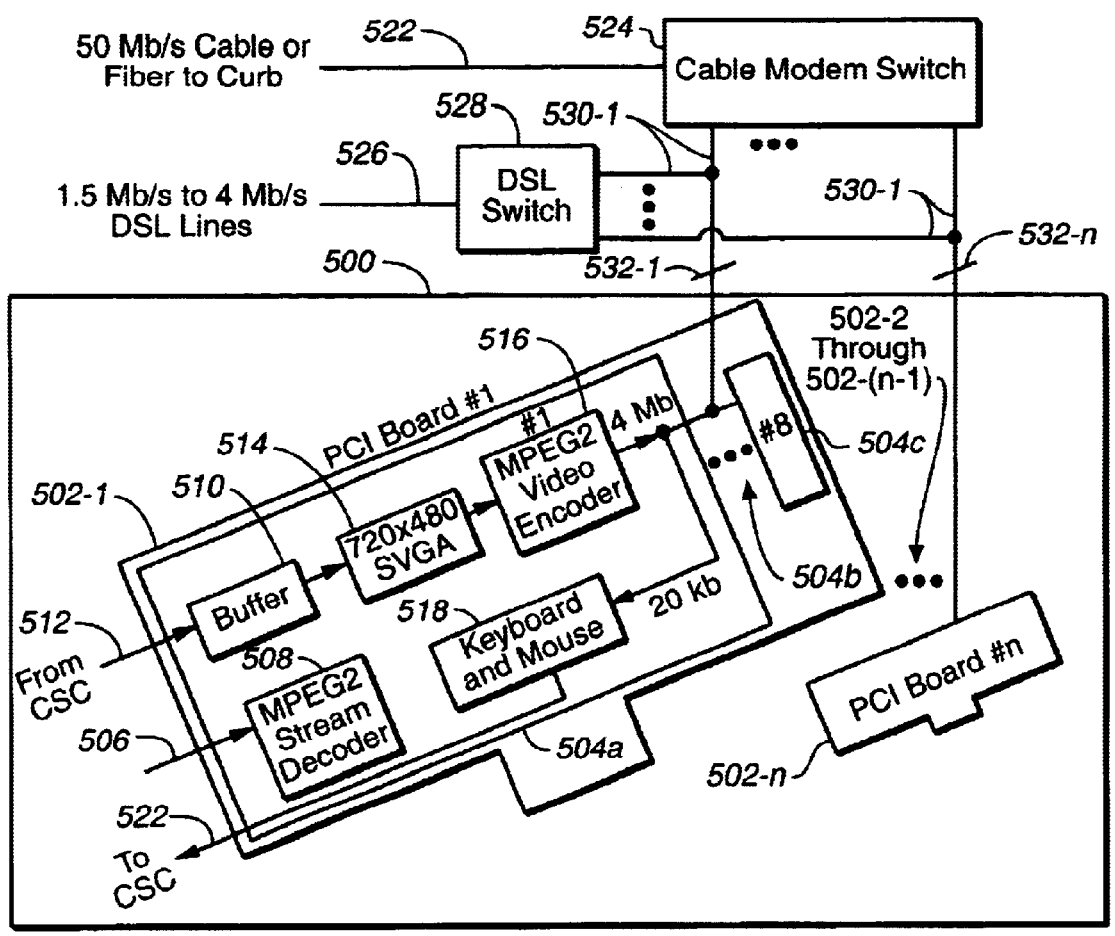
FIG._5

SERVER FOR OPERATION WITH A LOW-COST MULTIMEDIA TERMINAL

FIELD OF THE INVENTION

The present invention relates to the field of computer networks, and in particular to a server specifically adapted to operate with a low-cost multi-media terminal.

BACKGROUND OF THE INVENTION

Computer networks have been in existence for many years. The earliest networks were built using "dumb" terminals coupled to a powerful mainframe computer that serviced terminal users on a time-sharing basis. The "dumb" terminals consisted of little more than a keyboard, a monitor (such as a cathode ray tube or CRT), and a network interface. The capabilities of these terminals were limited to ASCII text and line-feed operation.

More recently, computer networks have been formed from combined platforms, e.g., workstation, personal computer (PC) and network computer (NC). These computer networks typically operate in a client/server framework in which many clients (operating on their platforms) connect to a single server or set of servers. The servers may provide client access to databases, the Internet, and application programs.

The most widely used computer network is the Internet. A client may select from several media sources for delivery of Internet access: a telephone company (telco) via a dial-up line, integrated services digital network (ISDN), digital subscriber line (DSL), cable access subscription, a dedicated Internet service provider (ISP) or some combination of these. A cable system using a fiber-optics line to the curb may enable transfer rates of 50 Mb/s, while the DSL switch features transfer rates between 1.5 Mb/s to 4 Mb/s.

A telco may provide each DSL subscriber a dedicated link to a central office, whereas a cable modulator/demodulator (modem) receives signals from a shared coaxial or hybrid fiber-coax cable system. Because of the shared nature of cable access, the cable transmission rate may diminish as the client load increases. Internet access for residential dwellings has been facilitated by the availability of cable service, whereas DSL has concentrated primarily on densely populated regions.

In contrast to the delivery of broadcast television service over a cable system, in which a low-cost audio/visual (A/V) decoder (such as a set-top-box) may be coupled to an analog receiver, Internet access over a cable system is largely associated with PC support hardware. A client may display images on a monitor using various standards such as video graphics array (VGA) or super VGA (SVGA). The accompanying module may be connected to the CPU. Also available to a client are memory storage/retrieval drives, a keyboard, a screen pointing device (most commonly a "mouse"), a software operating system, and serial ports for sundry peripherals. This represents a sophisticated multimedia system. The PC enables a client to quickly provide specific instructions through an interactive menu such as a "browser template" for Internet access, or the keyboard in a command-line window to edit a file formatted through an application.

A network computer is considered to be a "thin client", because the NC has less capability than a PC or workstation. A thin-client represents a user having only minimal hardware and corresponding software locally accessible for computer processing (such as a keyboard, monitor, and computer link). The thin client may log into a server with a username and password in order to attain access to the application programs and/or data files. A thin client may be considered a terminal dependent on the server to which it is connected for processing support, in contrast to a standalone self-contained PC. Except for the NC, a modern standalone platform supports a significant multimedia capability. Such a platform includes a sophisticated central processing unit (CPU), nonvolatile memory, supporting components and peripheral devices. These components contribute to the substantial cost of their respective platforms, not to mention the periodic upgrading of circuit-boards, peripheral drivers and application software. Although NC models may eventually achieve a sharply reduced purchase cost, these are comparatively sophisticated systems capable of executing sundry applications (such as Java applets).

Television reception and display represent technologies that predate the use of the PC and NC. Television equipment was designed for processing analog A/V signals. The A/V technology has been propelled towards digital media by the introduction of the digital video disk (DVD). Industry standards for compressing the A/V bitstream are defined by the Moving Photographic Expert Group (MPEG). The consumer electronics standard presently uses MPEG-2 that includes interlaced video and scalability. Interlaced video enables video frames to be divided into fields. Scalability allows coding for multiple bandwidth service. MPEG-2 uses lossy compression techniques to reduce memory storage requirements and intraframe coding to divide the frame into blocks and encode each block independently in a coder/decoder (codec). MPEG-2 video is established under International Standards Organization ISO/IEC 13818 Part 2, March, 1994.

The introduction of the WEBTV™ network service, available from Microsoft Corporation of Redmond, Wash., has provided Internet access to the thin client through a server across telephone lines. Internet terminals for WebTV are produced by Sony Electronics, Inc. of Park Ridge, N.J. and Philips Consumer Electronics Co. of Eindhoven, Netherlands. These suppliers, along with Mitsubishi Consumer Electronics America of Irvine, Calif., manufacture Internet receivers for WebTV. However, while WebTV may enable a thin client to email a message and receive an Internet webpage, it does not support applications such as word-processing (much less multi-tasking of application programs), nor video encoding for image frame manipulation.

Application service providers (ASPs) have also begun marketing software applications that may be executed on a server at the behest of a user. An ASP delivers software applications and stores client data on its servers. While superfluous for a user having a state-of-the-art PC with adequate memory storage, the ASP creates a distribution and support framework for network delivery of software and support files for a less capable PC. However, the ASP nonetheless requires the client platform, such as a NC, to have sufficient processing capability to run the software.

It would be desirable to have a distributed display terminal system that has real-time video display and audio with all the responses that a workstation, PC or NC would have, at low cost and minimal complexity. It would also be desirable to provide this distributed display terminal system with video scalability, hardware portability and function versatility that can augment future generation computer capabilities.

SUMMARY OF THE INVENTION

A server for providing personal computer (PC) functionality to a user at a multimedia terminal processes commands from the user. The server includes a source upgrade processor, a client software component for receiving a command signal from the user, a display updater for combining signals and a video encoder for sending a digital audio/visual (A/V) data-stream to a multimedia terminal. The server enables concurrent computer application processing for multiple simultaneous thin client users each having a multimedia terminal using a communication link to connect them to the server.

BRIEF DESCRIPTION OF THE FIGURES

FIG. 1 is a diagram illustrating a multimedia system according to a specific embodiment of the present invention.

FIG. 2 is a block diagram illustrating a server for a multimedia terminal according to a specific embodiment of the present invention.

FIG. 3 is a block diagram illustrating the server software architecture according to a specific embodiment of the present invention.

FIG. 4 is a block diagram showing hardware components associated with a multimedia terminal according to a specific embodiment of the present invention.

FIG. 5 is a block diagram showing a server setup according to a specific embodiment of the present invention.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

In accordance with a specific embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith.

In accordance with the present invention, a server provides the functional support for a low-cost encoded multimedia terminal. The functional support may include the system interface of an operating system, execution of a software application such as a word-processor or database spreadsheet, and driver signals to a peripheral such as a printer. The multimedia terminal includes a network interface, bitstream decoder and a display controller.

A networked configuration in accordance with the present invention is illustrated in FIG. 1, showing a multimedia terminal linked to a server. The multimedia terminal 102 can accept instructions from a user-input device 104 represented by a keyboard, and provide visual feedback on a screen display 106 (such as a SVGA computer monitor or a television set). The multimedia terminal 102 may be in communication with a local server 108 via a local wire connection 110. Alternatively, the multimedia terminal 102 may be in communication with a remote server 112 via a telephone line connection 114 or a high bandwidth network channel 116, represented by a parabolic antenna.

Examples of the user-input device 104 include, but are not limited to, a keyboard, a mouse, a joystick, a trackball, a trackpad, a touch screen, a light pen, a remote control unit (RCU), a microphone and a video camera. A microphone or video camera may require additional processor hardware in the multimedia terminal 102 to convert audio and/or video to a recognizable instruction. The high bandwidth channel 116 may preferably have a capacity of more than 10 Mb/s for reception by the multimedia terminal 102. Transmission from the multimedia terminal 102 may be satisfied with a lower capacity channel such as a cable modulator/demodulator (modem). Both criteria may be satisfied by asynchronous transfer mode (ATM) communication.

The server 112 may provide a real-time digital encoded A/V data-stream to the multimedia terminal 102 for image rendering on a screen display 106. The server 112 may also provide PC emulation for executing an application program. The server 112 may decode information from a browser or a disk drive to be re-encoded with supplemental display information such as a browser template or keystroke feedback to send to the multimedia terminal 102. The digital MPEG-2 A/V data-stream may be wrapped within a template without additional decoding or encoding and transmitted to the multimedia terminal 102 for encoding to the screen display 106.

In addition, the server 112 may enable the appearance of a template or menu option to be toggled on or off by a keystroke command from the user-input device 104. The server 112 may enable a message or a template to be embedded in a non-intrusive fashion so as not to obscure the principle image being viewed on the screen display 106 and yet provide a diagnostic warning or other necessary information to the user. The server 112 may also send multiple data-streams to the multimedia terminal 102 with the option for the user to select one or more datastreams using keystrokes and display them simultaneously on the screen display 106. Such images may be displayed as vertically or horizontally arranged matrices or as different sized windows or controls, in a similar fashion to a Unix workstation. The audio portion of the data-stream may also be selected by the user in a similar manner to the video selection.

A functional block diagram is shown in FIG. 2 of a server 112 connected to a multimedia terminal 102. The server 112 in the present invention may include an edit decoder 202, a source upgrade processor 204, a video mixer 206, a buffer 208 and a video encoder 210. The functionality of some of these components may be represented in hardware, software or a combination thereof. A client may transmit a command signal to the server 112 from a user-input device 104 through the multimedia terminal 102. An example command signal might be a cursor selection from a menu displayed on the screen display 106. The edit decoder 202 may receive the command signal and responsively interpret this signal as a client-edit command. The source upgrade processor 204 may be coupled to the edit decoder 202 to receive the client-edit command and configured to execute a software application associated with the instructed command signal.

The software application may process the client-edit command and responsively update a video frame held in a frame store 212 or buffer 208 from the video mixer 206. The video encoder 210 may be operatively coupled to the source upgrade processor 204 to receive the frame. The video encoder 210 may be configured to convert the frame into a multimedia bitstream for communication to the multimedia terminal 102. Upon receipt, the multimedia terminal 102 may decode the bitstream into a display data-stream or signal for the screen display 106 to present as a screen image.

The screen image may include a sequence of video frames, with each frame typically formatted from one or more source images. The first source image 214 (e.g., a desktop background) and a second source image 216 (e.g., a mouse cursor) may be combined to form a video frame by superimposing the second source image at a specified location appearing over the first source image. A video mixer 206 may perform the overlay in response to an instruction from the source upgrade processor 204. The source upgrade processor 204 can modify the source images 214 and 216, and specify their method of combination.

A source upgrade processor 204 may respond to the client-edit command of the edit decoder 202 by modifying the screen image on the display screen 106. The source upgrade processor 204 may send an instruction to a video mixer 206 for combining images from sources 214 and 216 as a composite frame. The video mixer 206 may send the composite frame to a video buffer 208, which passes the composite frame to a video encoder 210 for transmission to the multimedia terminal 102. The video buffer may pass the composite frame to a frame store 212 for comparison in the video mixer 206. In response to a command signal, the source upgrade processor 204 may also replace an image being received by the multimedia terminal 102 with another image. A menu selection may be passed from the edit decoder 202 to the source upgrade processor 204 to a program that provides an interface to an operating system or a software application. Such a program may be represented by a client software component, described subsequently.

The video mixer 206 may be configured to compare the combined frame with a previous frame stored in a frame store 212 and generate a difference or "delta" frame if the pixel differences between the combined and stored frames are less than some tolerance. The video mixer 206 then sends either the combined frame or the delta frame via a video buffer 208 to a video encoder 210. The video encoder 210 may receive a sequence of combined and delta frames representing a video frame, and compress the sequence into an encoded multimedia bitstream for transmission to the multimedia terminal 102.

In one embodiment, an edit decoder 202 receives a command signal from the multimedia terminal 102. The command signal may be converted into a client-edit command. Examples of a client-edit command include "move the cursor up", "select highlighted item", "return to previous screen", and so forth. In another embodiment, the edit decoder 202 may receive a command signal and convert it into a hardware peripheral signal, such as a keyboard keystroke, that would be expected by a standard microprocessor interface driver.

The first source image 214 may be an image signal stored in a memory device, and a second source 216 may be provided by a custom graphics circuit (e.g., for a three-dimensional object graphics rendering). The frame may be optimized to deliver the image data in a format suitable for the video encoder in the multimedia terminal 102, instead of for a screen display 106. For example, the frame may be rendered in blocks rather than scan lines, or may use a format that samples color components for only every other line, as with television. The coupling between graphics generation and video encoding may reduce hardware bandwidth and complexity. By providing the video processing in the server 112 rather than in the multimedia terminal 102, the latter's complexity and unit cost may be greatly reduced.

The video mixer 206 may process the provided frames in a rule-based manner that may allow the video mixer 206 to scan only a restricted region of the video frames for image changes. For example, if edit signal occurs in only one pixel block of the screen, this region can be defined by the software, and the video mixer 206 can reduce the amount of required processing by assuming no changes occur outside the delineated pixel block.

In one embodiment, the source upgrade processor 204 may be a simple application specific processor dedicated to tracking minor client-edit commands (such as cursor motion, three-dimensional object manipulation, and/or text and data entry) and coupled to a more powerful general purpose processor for saving old and accessing new source images. In another embodiment, the source upgrade processor 204 may be a personal computer microprocessor executing a software application and responding to a client-edit command in a conventional manner (i.e., updating a video display using a video card interface). In yet another embodiment, the source upgrade processor 204 may be a powerful multitasking processor that responds to several multimedia terminals, each accessing one or more software applications in a timesharing fashion.

These applications supported by the source upgrade processor 204 may include but are not limited to word-processing, data spread-sheet composition, graphics manipulation, digital video recording and playback viewing, telephone calling, video conferencing, multicast filtering, Internet web browsing, datafile recording, and supporting peripheral drivers. With a more versatile user-input device 104 than a typical remote control unit (RCU), the multimedia terminal 102 may enable the thin-client user to select menu options displayed on the screen display 106. A point-and-click device 104 may interactively be used to move a cursor on the screen display 106 to a screen position associated with a command signal. With a server port connected to the server 112 by modem, the multimedia terminal 102 may attain access to the Internet, rather than be limited to the reception of a limited-channel television signal feed.

The present invention also relates to a server 112 to provide appropriate hardware and software to enable a multimedia terminal 102 to perform in the manner that the subscriber would find indistinguishable from PC operation. The operating system for the server 112 may be accessible to multiple thin clients, each having a multimedia terminal 102, over a network through a software application capable of handling multiple thin-client platforms. Examples of such distributed operation software include WINFRAME® available from Citrix Systems, Inc. in Ft Lauderdale, Fla. and Blue Moon Rendering Tools from Blue Moon Systems of Silver Spring, Md. WinFrame operates on WINDOWS® available from Microsoft Corporation of Redmond, Wash. Blue Moon operates on Unix and Linux open source operations.

The server 112 may permit options such as sending to the multimedia terminal 102 a browser-embedded MPEG-2 data-stream that can be re-encoded with additional display information, or alternatively MPEG-2 video data-stream formatted as a video data subset within a template for user manipulation such as an Internet browser window. The server 112 may include embedded messages into the video data-stream, such as diagnostic warnings or help instructions in a window on the monitor distinct from the video imagery so as not to obscure or obtrusively interfere with the user's view. The bitstream may be controllable audio signals from a selectable source or video signals, whether compressed or uncompressed.

The multimedia terminal 102 may be designed for decoding and encoding A/V signals for playback on a screen display 106. Being limited to this function, the multimedia terminal 102 may be dependent on an external source for computer processing, including hardware and software. The server 112 may supply the necessary hardware and software structures for implementing the command signals a user may issue through the user-input device 104 connected to the multimedia terminal 102. The software structure functioning on the server CPU is shown in FIG. 3 by a tiered block diagram. In the arrangement shown, the hierarchy 300 progresses from the fundamental operating requirements of the hardware system at the bottom to the application-specific executable code towards the top. A network connection 302 may provide an input 304 from the multimedia terminal 102 to the server 112.

The server 112 may incorporate a CPU with an operating system 306 for processing and controlling data. The CPU may drive the source upgrade processor 204. The operating system 306 may also be run on the source upgrade processor 204 at the instruction of the client-subscriber from the multimedia terminal 102. A computer platform performing as a server 112 may use a commercial operating system such as Microsoft WindowsNT or an open source operating system such as Linux or Unix, although other operating systems are available for a PC. Each multimedia terminal setup may address the server 112 as a separate user frame for illustrating the menus and commands available to the user for interactively making selections. An example software program for the frame would be Citrix WinFrame, and this program may be executed for the first multimedia terminal in WinFrame #1 as 308-1 and so forth through WinFrame #n as 308-n for the n$^{th}$ multimedia terminal.

Between the operating system 306 and the frame program 308-1, several supporting programs may be executed for each multimedia terminal 102. These programs may include the server software component 310 for providing server functions, the network software component 312 for providing network support, and the client software component (CSC) 314. The CSC 314 may receive input from a keystroke updater 316a sent from the multimedia terminal 102 through the edit decoder 202 and passing through the source upgrade processor 204. The CSC 314 may send a response A/V data-stream to a display updater 316b to be transmitted to a video adapter module. The CSC 314 and the display updater 316b may cooperate to combine the response A/V data-stream and a digital A/V data-stream from an application to produce a digital updated A/V data-stream. The digital updated A/V data-stream may be encoded by the video encoder 210 for transmission to the multimedia terminal 102 as a digital A/V data-stream.

In a specific embodiment, the CSC 314 may have a frame 308-1 on one side to interface applications, and a keystroke updater 316a with a display updater 316b on the other side to communicate with the multimedia terminal 102. The frame 308-1 may be used to run different applications 318, including a web browser 320, a web page imager 322 or a MPEG-2 data-stream sender 324. These applications 318 may enable embedding a MPEG-2 decoded data-stream for re-encoding with additional display information, or alternatively sending a MPEG-2 video data-stream (or subset data-stream) formatted within in a browser window template.

The placement of the application 318 and network support 312 on the server 112 reduces the hardware cost of the thin client user by eliminating the need for the multimedia terminal 102 to provide this capability independently. In addition, software producers continually upgrade their software programs to add new features or alleviate code defects. Such changes in software may add to the lifecycle cost of a computer system. The cost in hardware and software upgrades and the risk of component failure may be passed on from the user to the server supplier, whether the cable service or a telco.

A setup for multiple multimedia terminals is illustrated in the FIG. 4 block diagram. A network 400 may connect to several multimedia terminal setups 102-1 through 102-n. Multimedia terminal setup #1 as 102-1 includes several components that are illustrated in cooperation. The block for terminal setup #n as 102-n and ellipses for terminal setups in between as 102-2 through 102-(n-1) are implied as duplicate counterparts of terminal setup #1. The components in the multimedia terminal 102-1 may include a low cost microprocessor 404 for the CPU with associated memory 406, an A/V decoder 408, and a software suite 410.

The microprocessor 404 may run on an operating system such as Nucleus 412a. Nucleus is an A/V embedded real-time operating system available from Accelerated Technology of Mobile, Ala. The microprocessor 404 may execute various software for supporting the multimedia terminal 102-1 such as a keystroke editor 412b to interface with the client software component (CSC), a multimedia terminal interfacing program 412c, a disk driver 412d such as for CD, VCD and DVD, and a printer driver 412e, all within software suite 410. The multimedia terminal 102 may support a variety of peripherals, including a screen display or monitor 106, a user-input device 104, and an optional printer 418. The A/V decoder 408 sends the decoded signal to the screen display 106 for displaying the image frame.

The server 112 may receive a signal either from the multimedia terminal is 102 via a cable modem 420 or by DSL 422. The cable signal 424a or DSL signal 424b from either the cable 420 or DSL 422 may be fed into a transport connection 426 from which the signal 424a or 424b may be input to the A/V decoder 408. The signal from transport connection 426 may be sent to the microprocessor 404 through the server port. In addition, a recorded signal 424c may be provided to the A/V decoder 408 from an optional drive 428, such as one of the varieties of CD or DVD. Alternatively, if the user employs an application software package 318 and creates data files thereby, these may be stored remotely in another form of memory media, such as a magnetic hard-drive disk. This memory may be associated with either the server 112 or the multimedia terminal 102. The microprocessor 404 may also send an input signal to the transport connection 426 to enable a user to interact with the images displayed on the screen display 106 based on command signals rendered on the user-input device 104.

The present invention contemplates network support being provided from a server 112 to multiple multimedia terminals as 102-1 through 102-n. By providing the hardware and software needed to establish an Internet connection, the server 112 may enable a link to be established between a remote user handling a multimedia terminal 102 and the Internet. This facilitates the economy of scale, since only one device may be needed to provide this functionality for multiple users at different locations.

The server 112 may have the additional feature of providing A/V media from a large depository from which to obtain a presentation selected by the user of the multimedia terminal 102. The media may be encoded in MPEG-2 and transmitted to the multimedia terminal 102 as an A/V data-stream, much as a pre-scheduled presentation can be sent by cable. However, the multimedia terminal 102 user may have greater control over the media source despite the distance between them. The user may send a command signal through the user-input device 104 to pause the presentation in order to attend to a matter requiring immediate attention, or related function.

A more detailed view for internal cooperation of the server 112 with the multimedia terminal 102 is available in the FIG. 5 block diagram. A peripheral component interconnect (PCI) board for a server 112 may include eight separate setups or modules for receiving an A/V signal from a cable or DSL. A series of PCI boards is depicted in the enclosed region 500 that include board #1 as 502-1 featuring detail, board #n as 502-n represented by a block, and the boards in between as 502-2 through 502-(n-1) represented by ellipses. The terminal PCI board #1 features module #1 as 504a (shown in detail), modules #2 through #7 as 504b (represented by ellipses) and module #8 as 504c (depicted by a symbolic block).

An A/V frame signal 506 or data-stream may be received in the MPEG-2 stream decoder 508. The frame signal 506 may be forwarded to a memory buffer 510 that also receives a response signal 512 from the CSC 314. The response signal 512 may be received in the buffer 510 and forwarded to the video adapter module 514 (with SVGA capability) for signal processing in the video encoder 516 from where it may be sent to the multimedia terminal 102 at a rate of 4 Mb/s. A command signal from the user-input device 104 may be received at a rate of 20 kb/s, and may be sent to the instruction processor 518 and forwarded by an edit-command signal 522 to the CSC 314.

The A/V signal to the modem switch may originate through a 50-Mb/s cable line 522 and routed via a cable switch 524, or through a DSL line 526 and routed via a DSL switch 528. The switches 524 and 528 can have a separate link to each PCI board, such as a line 530-1 to PCI board #1 as 502-1 or line 530-n to PCI board #n as 502-n and corresponding lines in between for PCI boards #2 as 502-2 through #n as 502-(n-1). Each of the lines 530-1 through 530-n to the PCI boards 502-1 through 502-n may be governed by a multi-part switch 532-1 through 532-n that routes the signal to the appropriate server function on the PCI board, such as module #1 as 504a through module #8 as 504c. Each module may support a selected multimedia terminal 102. The switches 532-1 through 532-n enable the server 112 to connect to many terminals simultaneously.

The multimedia terminal 102 and the server 112 can be remotely located from each other and one server 112 could provide processing for several multimedia terminals concurrently. This arrangement enables a central site location for establishing a server 112 to enable home-based users to access PC and Internet functionalities without the attendant hardware and software being co-located in the home or office. Instead, through the multimedia terminal 102, the user may establish a connection to the remote server 112 and thereby to the Internet and/or an executable program in the suite of software applications available.

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A server for providing a digital audio/visual (A/V) network interface to a multimedia terminal, said multimedia terminal having a user-input device for sending a command signal from said multimedia terminal to said server, said server comprising:
    a source upgrade processor for processing the command signal into a client-edit command;
    a client software component (CSC) for receiving and processing said client-edit command to produce a response A/V data-stream;
    a display updater for combining said response A/V data-stream from said CSC and a digital A/V data-stream received from an application on the server to produce a digital updated A/V data-stream; and
    a video encoder for encoding said digital updated A/V data-stream to produce a digital A/V data-stream for sending to the multimedia terminal.

2. A server according to claim 1 further including:
    a frame processor for producing a frame displayable on an A/V display unit in response to said response A/V data-stream from said CSC, said frame having a frame-containing A/V data-stream, said frame processor enabling said digital A/V data-stream to be displayed within said frame-containing A/V data-stream.

3. A server according to claim 1 further including:
    an edit decoder for receiving the command signal;
    a frame source for providing at least one image frame; and
    a video mixer for combining said response A/V data-stream and at least one image frame to produce said digital updated A/V data-stream for sending to said video encoder.

4. A server according to claim 1 wherein said response A/V data-stream includes a video data subset for displaying the menu on the screen display.

5. A server according to claim 1 further comprising:
    a server processor for executing a server software program;
    a network processor for executing a network software program; and
    a frame processor for executing a frame application program to produce a frame displayable on an A/V display unit, said frame processor being associated with said server processor, said network processor and said CSC, said frame having a frame-containing A/V data-stream, wherein said frame processor enables said digital A/V data-stream to be displayed within said frame-containing data-stream.

6. A server according to claim 5 further comprising:
    a network browser processor for executing a network browser program, said network browser processor being associated with said frame processor, for producing a web page image for displaying on said A/V display unit, and for processing a web-associated video stream.

7. A server according to claim 5 wherein said network processor enables a user to select at least one bitstream source from a plurality of simultaneously available bitstream sources, wherein said at least one source is selectable by the user-input device.

8. A server according to claim 5 wherein said frame processor enables the user to toggle a user switch on the user-input device for either displaying or vanishing said frame.

9. A server according to claim 5 wherein said frame processor enables a user to controllably alternate between a first frame and a second frame by the user-input device.

10. A server according to claim 5 wherein said frame processor enables a diagnostic data-stream to be displayed within said frame-containing data-stream.

11. A server according to claim 10 wherein said frame processor enables the user to controllably adjust a frame area of said frame-containing data-stream within a display area of said A/V display unit, wherein said display area is a portion of the entire display area of said A/V display unit.

12. A server according to claim 10 wherein said frame processor enables the user to controllably send a response to said diagnostic data-stream with the user-input device.

13. A server according to claim 1 wherein said video stream decoder conforms to the Moving Pictures Expert Group (MPEG)-2 standard.

14. A server according to claim 13 wherein said video adapter module conforms to the video graphics array (VGA) standard.

15. A server according to claim 13 wherein said video adapter module conforms to the super video graphics array (SVGA) standard.

16. A server according to claim 1 wherein said source upgrade processor is a taken from the group consisting of an application specific processor, a PC microprocessor and a multitasking processor.

17. A method for providing a network interface to a user through a server, said server sending a digital audio/visual (A/V) data-stream to a multimedia terminal, wherein said multimedia terminal can send a command signal from said user to said server, said method for said server comprising:

receiving the command signal from the user-input device by a client software component (CSC);

processing the command signal via said CSC to produce a digital response A/V data-stream;

combining said digital response A/V data-stream from said CSC and an application A/V data-stream from the server by a display updater to produce a digital updated A/V data-stream;

encoding said digital updated A/V data-stream by a video encoder to produce the digital encoded A/V data-stream; and transmitting the digital encoded A/V data-stream via the network to an A/V display unit.

18. A method for providing a network interface to a user through a server according to claim 17 further comprising:

first executing a server software program, said server software program being executed via a server processor;

second executing a network software program, said network software program being executed via a network processor; and third executing a frame application program, said frame application software program being executed via a frame processor, said frame processor being associated with said server processor, said network processor and said CSC.

19. A method for providing a network interface to a user through a server system, said user connecting to a network, said server system having a multimedia terminal for receiving a digital audio/visual (A/V) data-stream from said network, and a server for transmitting said digital A/V data-stream from said network to said multimedia terminal, said method comprising:

sending a command signal via a user-input device on the multimedia terminal through a server port to a client software component (CSC) on the server;

processing said command signal in said CSC to produce a digital response A/V data-stream;

combining said digital response A/V data-stream and an A/V data-stream from an application on the server by a display updater on the server to produce a digital updated A/V data-stream;

encoding said digital updated A/V data-stream by a video encoder on the server to produce the digital A/V data-stream;

transmitting the digital A/V data-stream from said video encoder via the network to the multimedia terminal;

receiving the digital A/V data-stream from the server via said server port on the multimedia terminal;

decoding the digital A/V data-stream from said server port via a video stream decoder to produce a display signal; and transmitting said display signal to an A/V display unit.

20. A programmable storage device readable by a machine tangibly embodying a program of instructions executable by the machine to perform method steps for providing a network interface to a user through a server, said server sending a digital encoded audio/visual (A/V) data-stream to a multimedia terminal, wherein said multimedia terminal can send a command signal from said user to said server, said method steps comprising:

receiving the command signal from the user-input device by a client software component (CSC);

processing the command signal via said CSC to produce a digital response A/V data-stream;

combining said digital response A/V data-stream from said CSC and an application A/V data-stream from the server by a display updater to produce a digital updated A/V data-stream;

encoding said digital updated A/V data-stream by a video encoder to produce the digital encoded A/V data-stream; and transmitting the digital encoded A/V data-stream via the network to an A/V display unit.

21. A programmable storage device for providing a network interface to a user through a server according to claim 20 further comprising:

first executing a server software program, said server software program being executed via a server processor;

second executing a network software program, said network software program being executed via a network processor; and third executing a frame application program, said frame application software program being executed via a frame processor, said frame processor being associated with said server processor, said network processor and said CSC.

* * * * *